(12) United States Patent
Wang et al.

(10) Patent No.: US 12,288,863 B1
(45) Date of Patent: Apr. 29, 2025

(54) METHOD FOR PREPARING NEGATIVE ELECTRODE SHEET OF NICKEL-METAL HYDRIDE BATTERY

(71) Applicant: SHENZHEN EPT BATTERY CO., LTD, Guangdong (CN)

(72) Inventors: Weidong Wang, Guangdong (CN); Chu Gao, Guangdong (CN); Shenglong Cao, Guangdong (CN); Shoujun Wang, Guangdong (CN); Xiaoliang Yang, Guangdong (CN); Lei Yuan, Guangdong (CN); Zhaofeng Wu, Guangdong (CN)

(73) Assignee: SHENZHEN EPT BATTERY CO., LTD, Shenzhen (CN)

( * ) Notice: Subject to any disclaimer, the term of this patent is extended or adjusted under 35 U.S.C. 154(b) by 0 days.

(21) Appl. No.: 18/860,021

(22) PCT Filed: Jun. 3, 2024

(86) PCT No.: PCT/CN2024/096929
§ 371 (c)(1),
(2) Date: Oct. 25, 2024

(30) Foreign Application Priority Data

Oct. 20, 2023 (CN) .......................... 202311372962.5

(51) Int. Cl.
*H01M 4/20* (2006.01)
*H01M 4/04* (2006.01)
*H01M 4/02* (2006.01)
(52) U.S. Cl.
CPC ....... *H01M 4/0404* (2013.01); *H01M 4/0433* (2013.01); *H01M 2004/027* (2013.01)

(58) Field of Classification Search
CPC ............. H01M 4/0404; H01M 4/0433; H01M 2004/027
See application file for complete search history.

(56) References Cited

FOREIGN PATENT DOCUMENTS

| CN | 101984513 A | 3/2011 |
| CN | 202513231 U | 10/2012 |
| CN | 205248367 U | 5/2016 |

(Continued)

OTHER PUBLICATIONS

Machine translation of WO 2021-112553, retrieved from <www.espacenet.com> on Feb. 13, 2025.*

(Continued)

*Primary Examiner* — Cynthia K Walls

(57) ABSTRACT

Provided is a method for preparing a negative electrode sheet of nickel-metal hydride battery. The method includes steps of: obtaining a substrate roll; unwinding the substrate roll to unroll the substrate roll to form a substrate assembly (100), the substrate assembly (100) having a first-ring exposed segment (110), a middle-ring covered segment (120) and a tail-ring exposed segment (130) which are sequentially connected; and performing a slurry pulling treatment on the substrate assembly (100) to form a first active layer (210) and a second active layer (220) that are formed together on two opposite side faces of the substrate assembly (100), the first active layer (210) being attached to the first-ring exposed segment (110) and the middle-ring covered segment (120), and the second active layer (220) being attached to the middle-ring covered segment (120) and the tail-ring exposed segment (130).

9 Claims, 11 Drawing Sheets

(56) References Cited

FOREIGN PATENT DOCUMENTS

| | | | |
|---|---|---|---|
| CN | 106848443 A | 6/2017 | |
| CN | 109326772 A | 2/2019 | |
| CN | 115634823 A | 1/2023 | |
| JP | H09190836 A | 7/1997 | |
| WO | WO 2021-112553 | * 6/2021 | ............ H01M 10/04 |

OTHER PUBLICATIONS

International Search Report of PCT Patent Application No. PCT/CN2024/096929 issued on Jul. 29, 2024.
Written Opinion of the International Searching Authority of PCT Patent Application No. PCT/CN2024/096929 issued on Jul. 29, 2024.

* cited by examiner

METHOD FOR PREPARING NEGATIVE ELECTRODE SHEET OF NICKEL-METAL HYDRIDE BATTERY

CROSS-REFERENCE TO RELATED APPLICATIONS

The present application claims priority to Chinese Application No. 202311372962.5, filed with the Chinese intellectual Property office on Oct. 20, 2023, entitled "Negative Electrode Sheet of Nickel-Metal Hydride Battery, Method for Preparing the Same and Nickel-Metal Hydride Battery", which is hereby incorporated by reference in its entirety.

FIELD OF THE PRESENT INVENTION

The invention relates to the field of processing technique of nickel-metal hydride battery, in particular to a negative electrode sheet of nickel-metal hydride battery, a method for preparing the same and a nickel-metal hydride battery.

BACKGROUND OF THE PRESENT INVENTION

A nickel-metal hydride battery includes an electrode assembly, a cap and a steel shell, and the electrode assembly is obtained by stacking and winding a negative electrode sheet, a separator and a positive electrode sheet. The existing forms of the nickel-metal hydride battery include a nickel-metal hydride button battery, a nickel-metal hydride cylindrical battery and the like, and the tightness of an electrode assembly of the nickel-metal hydride battery in any existing form is difficult to control, so that the electrochemical performance of the nickel-metal hydride battery is influenced due to the deformation of the electrode assembly or the internal cracking of the electrode assembly. In order to ensure the electrochemical performance of the nickel-metal hydride battery well, the tightness of the electrode assembly is generally required to be controlled, for example, Chinese Application No. 200520073477.9 discloses that a fixing device for preventing the volume of the electrode assembly from changing is arranged in the steel case, that is, a rod inserted into the winding core of the electrode assembly is arranged in the steel case, so that the looseness of the electrode assembly can be well controlled, and the electrochemical performance of the nickel-metal hydride battery is improved. For another example, Chinese Patent Application No. 202223535810.6 discloses that a three-claw elastic piece is retrofitted between a battery cap and a positive electrode plate of a button battery and the three-claw elastic piece can provide stable elasticity, thereby effectively adjusting the tightness of the positive and negative electrode plates and the separator, and further improving the electrochemical performance of the nickel-metal hydride battery. However, all the described nickel-metal hydride batteries need to provide an additional structure on the steel shell or the cap to limit and control the tightness of the electrode assembly, the energy density of the nickel-metal hydride battery is reduced to some extent, and the assembling and processing costs of the nickel-metal hydride battery are increased.

SUMMARY OF THE PRESENT INVENTION

The object of the present invention is to overcome the defects in the prior art and provide a negative electrode sheet of nickel-metal hydride battery, a method for preparing the same and a nickel-metal hydride battery, which ensures the energy density of the nickel-metal hydride battery and achieves effective control of the tightness of the electrode assembly of the nickel-metal hydride battery under the condition of reducing the assembling and processing costs of the nickel-metal hydride battery.

The object of the present invention is achieved by the following technical solutions.

A negative electrode sheet of nickel-metal hydride battery, including:
- a substrate assembly, the substrate assembly including a first-ring exposed segment, a middle-ring covered segment and a tail-ring exposed segment, the first-ring exposed segment, the middle-ring covered segment and the tail-ring exposed segment being sequentially connected; and
- an active layer assembly, the active layer assembly including a first active layer and a second active layer that are located on two opposite side faces of the middle-ring covered segment, the first active layer being attached to the first-ring exposed segment and the middle-ring covered segment, and the second active layer being attached to the middle-ring covered segment and the tail-ring exposed segment.

In one of the embodiments, a first wedge-shaped face is formed on an end face of the first active layer that is further from the middle-ring covered segment, and the first wedge-shaped face is disposed towards a direction deviating from the first-ring exposed segment.

In one of the embodiments, a second wedge-shaped face is formed on an end face of the second active layer that is further from the middle-ring covered segment, and the second wedge-shaped face is disposed towards a direction deviating from the tail-ring exposed segment.

In one of the embodiments, the first wedge-shaped face is parallel to the second wedge-shaped face.

In one of the embodiments, the first wedge-shaped face is disposed opposite to the second wedge-shaped face when the negative electrode sheet is wound to form an electrode assembly.

A method for preparing a negative electrode sheet of nickel-metal hydride battery, including steps of:
- obtaining a substrate roll;
- unwinding the substrate roll to unroll the substrate roll to form a substrate assembly, the substrate assembly comprising a first-ring exposed segment, a middle-ring covered segment and a tail-ring exposed segment, the first-ring exposed segment, the middle-ring covered segment and the tail-ring exposed segment are sequentially connected; and
- performing a slurry pulling treatment on the substrate assembly to form a first active layer and a second active layer that are formed together on two opposite side faces of the substrate assembly, the first active layer being attached to the first-ring exposed segment and the middle-ring covered segment, and the second active layer being attached to the middle-ring covered segment and the tail-ring exposed segment.

In one of the embodiments, performing a slurry pulling treatment on the substrate assembly comprises steps of:
- performing a slurry applying treatment on the substrate assembly to form active slurry layers which are formed on two opposite side faces of the substrate assembly and thicknesses of which are correspondingly greater than that of the first active layer and the second active layer; and performing a slurry scraping treatment on the substrate assembly after the slurry applying treatment to form the first active layer and the second active layer that are correspondingly formed on the two opposite side faces of the substrate assembly.

In one of the embodiments, after the step of performing a slurry pulling treatment on the substrate assembly, the method for preparing a negative electrode sheet further comprises a step of:

performing a drying treatment to the first active layer and the second active layer.

In one of the embodiments, after the step of performing a drying treatment to the first active layer and the second active layer, the method for preparing a negative electrode sheet further comprises a step of:

performing a roller pressing treatment to the first active layer and the second active layer after the drying treatment.

A nickel-metal hydride battery, including a positive electrode sheet, a separator and the negative electrode sheet according to any one of the embodiments, the positive electrode sheet, the separator and the negative electrode sheet are sequentially stacked and wound to form an electrode assembly, and the first-ring exposed segment, the first active layer, the second active layer and the tail-ring exposed segment form a first ring, a second ring, a second-last ring and a last ring of the electrode assembly, respectively.

Compared with the prior art, the present invention has at least the following advantages:

according to the negative electrode sheet of nickel-metal hydride battery of the present invention, the first active layer is only covered on the first-ring exposed segment and the middle-ring covered segment, the second active layer is only covered the middle-ring covered segment and the tail-ring exposed segment, so that when the negative electrode sheet is pre-wound with a side of the substrate assembly that is closer to the second active layer as an inner layer, the first-ring exposed segment forms an innermost layer and the first active layer forms a second inner layer, and then the negative electrode sheet is wound together with the separator and the positive electrode sheet, thus buffering the volume and relieving the stress of the pre-winding negative electrode sheet of nickel-metal hydride battery. In addition, when the negative electrode sheet is completed winding with a side of the substrate assembly that is closer to the first active layer as an outer layer, the tail-ring exposed segment forms an outermost layer and the second active layer forms a second outer layer, thus buffering the volume and relieving the stress of the winding negative electrode sheet of nickel-metal hydride battery, thereby ensuring the energy density of the nickel-metal hydride battery and achieving effective control of the tightness of the electrode assembly of the nickel-metal hydride battery without additional structure and thus effectively reducing the assembling and processing costs of the nickel-metal hydride battery. Preferably, the at least one groove formed in the surface of the bottom of the shell comprises pluralities of grooves, and the pluralities of grooves are: radially formed in a front end of the surface of the bottom of the shell; formed in the front end of the surface of the bottom of the shell in parallel; formed in two sides of the air duct suction opening in parallel; or radially formed in two sides of the air duct suction opening.

BRIEF DESCRIPTION OF THE DRAWINGS

In order to more clearly illustrate the technical solutions of the embodiments of the present invention, the drawings that are needed in the embodiments will be briefly described below, it being understood that the following drawings only illustrate some embodiments of the present invention and therefore should not be considered as limiting the scope, and other related drawings may be obtained according to these drawings without inventive effort for a person skilled in the art.

DETAILED DESCRIPTION OF ILLUSTRATED EMBODIMENTS

Figure 1:
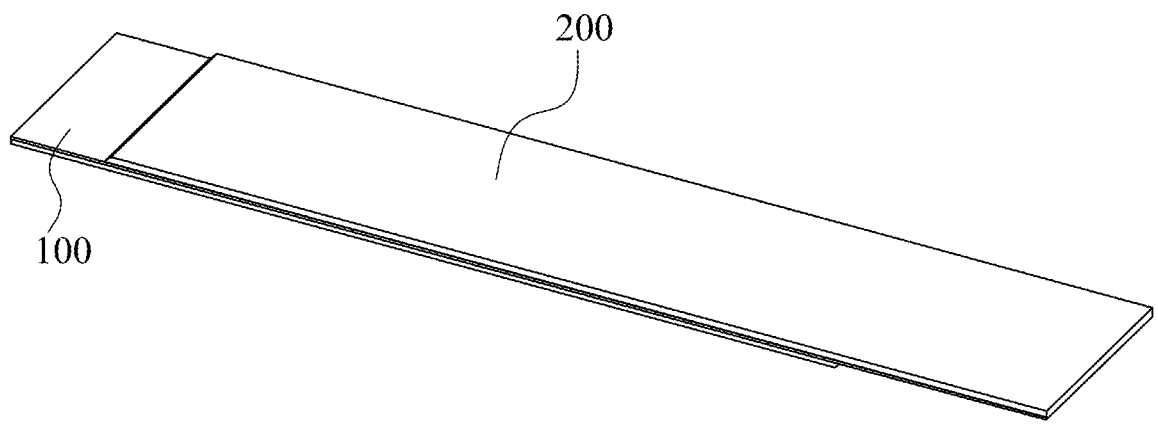
FIG. 1 is a schematic structural view of a negative electrode sheet of nickel-metal hydride battery according to an embodiment of the present invention.

In order that the invention may be readily understood, a more complete description of the invention will be rendered by reference to the appended drawings. The drawings illustrate preferred embodiments of the invention. The invention may, however, be embodied in many different forms and should not be construed as limited to the embodiments set forth herein. Rather, these embodiments are provided so that the disclosure will be thorough and complete.

It will be understood that when an element is referred to as being "fixed to" another element, it can be directly on the other element or intervening elements may also be present. When an element is referred to as being "connected" to another element, it can be directly connected to the other element or intervening elements may also be present. The terms "vertical," "horizontal," "left," "right," and the like as used herein are for illustrative purposes only and do not denote a single embodiment.

Unless defined otherwise, all technical and scientific terms used herein have the same meaning as commonly understood by one of ordinary skill in the art to which this invention belongs. The terminology used herein in the description of the invention is for the purpose of describing embodiments only and is not intended to be limiting of the invention. The term "and/or" as used herein includes any and all combinations of one or more of the associated listed items.

A negative electrode sheet of nickel-metal hydride battery is provided in the present disclosure. The negative electrode sheet includes a substrate assembly and an active layer assembly. The substrate assembly includes a first-ring exposed segment, a middle-ring covered segment and a tail-ring exposed segment, and the first-ring exposed segment, the middle-ring covered segment and the tail-ring exposed segment are sequentially connected. The active layer assembly includes a first active layer and a second active layer that are located on two opposite side faces of the middle-ring covered segment, the first active layer is attached to the first-ring exposed segment and the middle-ring covered segment, and the second active layer is attached to the middle-ring covered segment and the tail-ring exposed segment.

According to the negative electrode sheet of nickel-metal hydride battery described above, the first active layer is only covered on the first-ring exposed segment and the middle-ring covered segment, the second active layer is only covered the middle-ring covered segment and the tail-ring exposed segment, so that when the negative electrode sheet is pre-wound with a side of the substrate assembly that is closer to the second active layer as an inner layer, the first-ring exposed segment forms an innermost layer and the first active layer forms a second inner layer, and then the negative electrode sheet is wound together with the separator and the positive electrode sheet, thus buffering the volume and relieving the stress of the pre-winding negative electrode sheet of nickel-metal hydride battery. In addition, when the negative electrode sheet is completed winding with a side of the substrate assembly that is closer to the first active layer as an outer layer, the tail-ring exposed segment forms an outermost layer and the second active layer forms a second outer layer, thus buffering the volume and relieving the stress of the winding negative electrode sheet of nickel-metal hydride battery, thereby ensuring the energy density of the nickel-metal hydride battery and achieving effective control of the tightness of the electrode assembly of the nickel-metal hydride battery without additional structure and thus effectively reducing the assembling and processing costs of the nickel-metal hydride battery.

In order to better understand the nickel-metal hydride battery negative electrode piece of the present application, the nickel-metal hydride battery negative electrode piece of the present application will be further explained and illustrated below.

Figure 2:
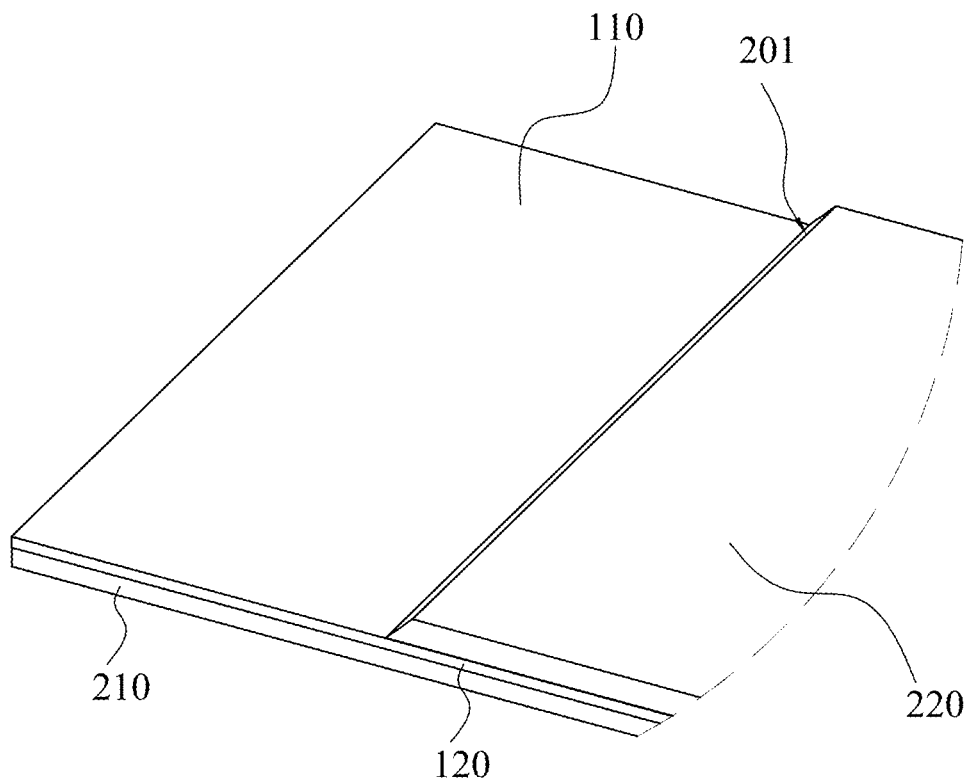
FIG. 2 is a partial schematic view of the negative electrode sheet of nickel-metal hydride battery shown in FIG. 1.
Figure 3:
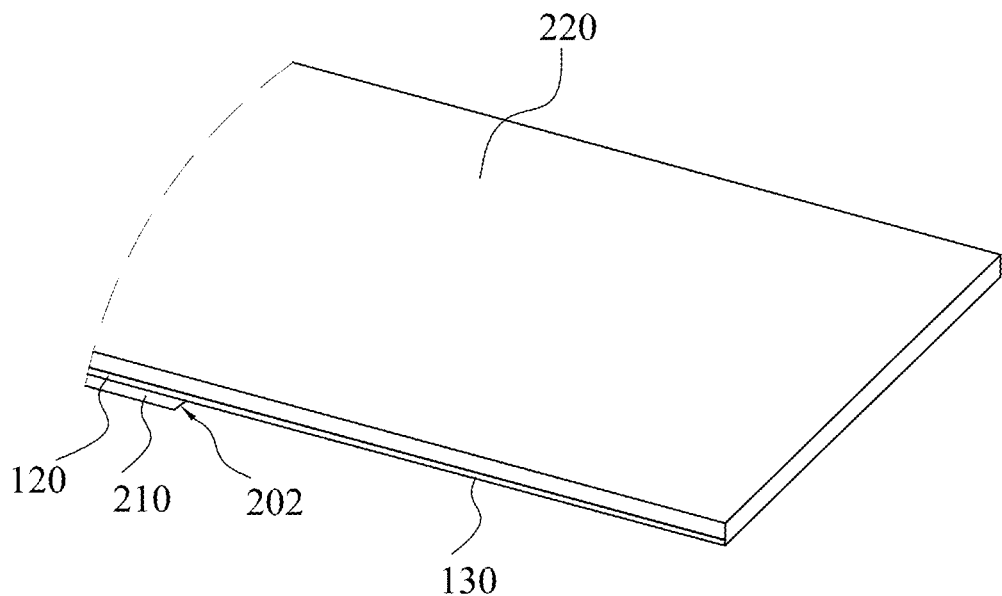
FIG. 3 is another partial schematic view of the negative electrode sheet of nickel-metal hydride battery shown in FIG. 1.

Referring to FIGS. 1 to 3, a negative electrode sheet 10 of nickel-metal hydride battery according to an embodiment includes a substrate assembly 100 and an active layer assembly 200. The substrate assembly 100 includes a first-ring exposed segment 110, a middle-ring covered segment 120 and a tail-ring exposed segment 130, the first-ring exposed segment 110, and the middle-ring covered segment 120 and the tail-ring exposed segment 130 are connected in sequence. The active layer assembly 200 includes a first active layer 210 and a second active layer 220 that are located on two opposite side faces of the middle-ring covered segment 120, the first active layer 210 is attached to the first-ring exposed segment 110 and the middle-ring covered segment 120, and the second active layer 220 is attached to the middle-ring covered segment 120 and the tail-ring exposed segment 130.

According to the negative electrode sheet 10 of nickel-metal hydride battery described above, the first active layer 210 is only covered on the first-ring exposed segment 110 and the middle-ring covered segment 120, the second active layer 220 is only covered the middle-ring covered segment 120 and the tail-ring exposed segment 130, so that when the negative electrode sheet 10 is pre-wound with a side of the substrate assembly 100 that is closer to the second active layer 220 as an inner layer, the first-ring exposed segment 110 forms an innermost layer and the first active layer 210 forms a second inner layer, and then the negative electrode sheet 10 is wound together with the separator and the positive electrode sheet, thus buffering the volume and relieving the stress of the negative electrode sheet 10 of nickel-metal hydride battery that is pre-wound. In addition, when the negative electrode sheet 10 is completed winding with a side of the substrate assembly 100 that is closer to the first active layer 210 as an outer layer, the tail-ring exposed segment 130 forms an outermost layer and the second active layer 220 forms a second outer layer, thus buffering the volume and relieving the stress of the negative electrode sheet 10 of nickel-metal hydride battery that is completed winding, thereby ensuring the energy density of the nickel-metal hydride battery and achieving effective control of the tightness of the electrode assembly of the nickel-metal hydride battery without additional structure and thus effectively reducing the assembling and processing costs of the nickel-metal hydride battery.

Referring to FIGS. 1 to 3, in one of the embodiments, a first wedge-shaped face 201 is formed on an end face of the first active layer 210 that is further from the middle-ring covered segment 120, and the first wedge-shaped face is disposed towards a direction deviating from the first-ring exposed segment 110, so that circular transition is facilitated when the negative electrode sheet 10 is wound together with the positive electrode sheet and the separator to form an electrode assembly, that is, the electrode assembly is facilitated to form a regular cylinder, and the smooth placement of the electrode assembly in the steel shell is facilitated.

Referring to FIGS. 1 to 3, in one of the embodiments, a second wedge-shaped face 202 is formed on an end face of the second active layer 220 that is further from the middle-ring covered segment 120, and the second wedge-shaped face is disposed towards a direction deviating from the tail-ring exposed segment 130, so that circular transition is facilitated when the negative electrode sheet 10 is wound together with the positive electrode sheet and the separator to form an electrode assembly, that is, the electrode assembly is facilitated to form a regular cylinder, and the smooth placement of the electrode assembly in the steel shell is facilitated.

Referring to FIGS. 1 to 3, in one of the embodiments, the first wedge-shaped face 201 is parallel to the second wedge-shaped face 202. Further, the first wedge-shaped face 201 is disposed opposite to the second wedge-shaped face 202 when the negative electrode sheet 10 is wound to form an electrode assembly, which is further beneficial to the circular transition when the negative electrode sheet 10 is wound together with the positive electrode sheet and the separator to form the electrode assembly, that is, the electrode assembly is facilitated to form a regular cylinder, and the smooth placement of the electrode assembly in the steel shell is further facilitated.

In one of the embodiments, the first-ring exposed segment 110 has a length of 8±0.5 mm. Further, the tail-ring exposed segment 130 has a length of 32±0.5 mm. It can be understood that the winding times of a common negative electrode sheet of nickel-metal hydride battery are 6-7 circles, so that the length of the first-ring exposed segment 110 is 8±0.5 mm, the innermost layer is preferably ensured to be the first circle exposed segment 110, and the length of the tail-ring exposed segment 130 is 32±0.5 mm, the outermost layer is preferably ensured to be the tail-ring exposed segment 130, and further the energy density of the nickel-metal hydride battery is ensured, and the effective control of the tightness of the electrode assembly of the nickel-metal hydride battery is realized.

Referring to FIGS. 1 to 3, in one of the embodiments, the first-ring exposed segment 110, the middle-ring covered segment 120 and the tail-ring exposed segment 130 are integrally formed, so that the connection stability and the structural compactness of the substrate assembly 100 are improved.

In one of the embodiments, the first-ring exposed segment 110 is a steel mesh segment. Further, the middle-ring covered segment 120 is a steel mesh segment. And further, tail-ring exposed segment 130 a steel mesh segment.

In one of the embodiments, the first wedge-shaped face intersects with a plane where the first-ring exposed segment is located at an angle of 30° to 45° and the second wedge-shaped face intersects with a plane where the tail-ring exposed segment is located at an angle of 30° to 45°, which is further beneficial to the circular transition when the negative electrode sheet 10 is wound together with the positive electrode sheet and the separator to form the electrode assembly, that is, the electrode assembly is facilitated to form a regular cylinder, and the smooth placement of the electrode assembly in the steel shell is further facilitated.

A method for preparing a negative electrode sheet of nickel-metal hydride battery is also provided in the present disclosure for preparing the negative electrode sheet of any embodiment. The method for preparing a negative electrode sheet of nickel-metal hydride battery includes steps of:

obtaining a substrate roll;

unwinding the substrate roll to unroll the substrate roll to form a substrate assembly, the substrate assembly comprising a first-ring exposed segment, a middle-ring covered segment and a tail-ring exposed segment, the first-ring exposed segment, the middle-ring covered segment and the tail-ring exposed segment are sequentially connected; and performing a slurry pulling treatment on the substrate assembly to form a first active layer and a second active layer that are formed together on two opposite side faces of the middle-ring covered segment, the first active layer being attached to the first-ring exposed segment and the middle-ring covered segment, and the second active layer being attached to the middle-ring covered segment and the tail-ring exposed segment.

In order to better understand the method for preparing a negative electrode sheet of nickel-metal hydride battery of the present application, the method for preparing a negative electrode sheet of nickel-metal hydride battery of the present application will be further explained and illustrated below.

Figure 4:
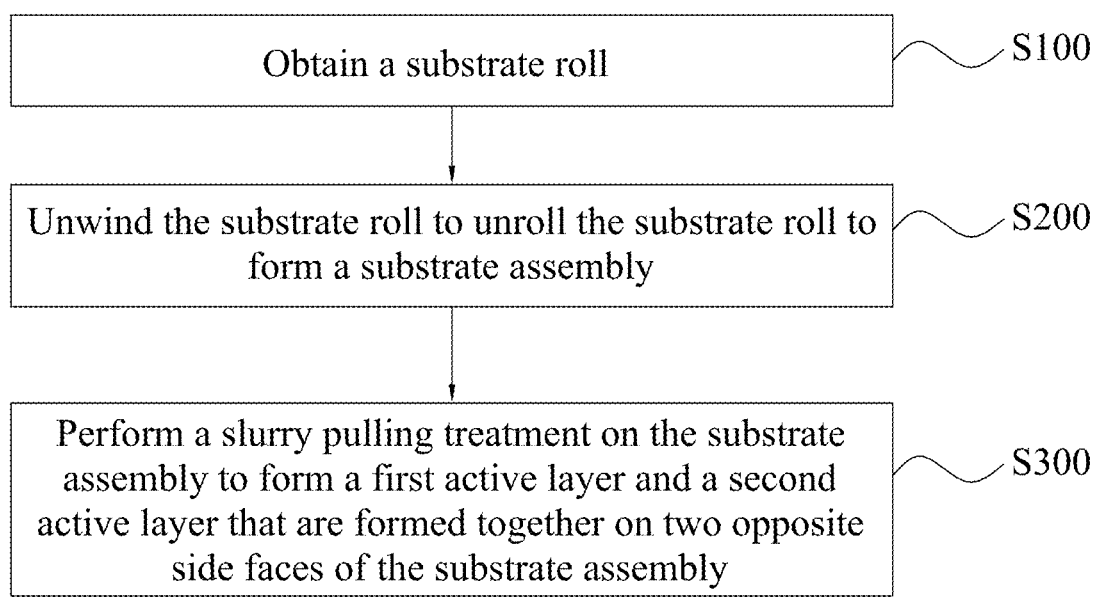
FIG. 4 is a flowchart of a method for preparing a negative electrode sheet of nickel-metal hydride battery according to an embodiment of the present invention.

Referring to FIG. 4, the method for preparing a negative electrode sheet of nickel-metal hydride battery according to an embodiment includes the steps of:

S100, obtaining a substrate roll. It can be understood that the substrate roll includes a plurality of substrate assemblies, and the plurality of substrate assemblies is sequentially arranged and connected along the width direction of the substrate assemblies, i.e. the plurality of substrate assemblies is sequentially and transversely arranged and connected.

S200, unwinding the substrate roll to unroll the substrate roll to form a substrate assembly. It will be appreciated that the substrate assembly comprising a first-ring exposed segment, a middle-ring covered segment and a tail-ring exposed segment, and the first-ring exposed segment, the middle-ring covered segment and the tail-ring exposed segment are sequentially connected; and S300, performing a slurry pulling treatment on the substrate assembly to form a first active layer and a second active layer that are formed together on two opposite side faces of the substrate assembly. It should be noted that, the first active layer and the second active layer that are located on two opposite side faces of the middle-ring covered segment, the first active layer is attached to the first-ring exposed segment and the middle-ring covered segment, and the second active layer is attached to the middle-ring covered segment and the tail-ring exposed segment.

It can be understood that, if the active material layers are formed on the opposite side faces of the substrate assembly, that is, on the basis of the negative electrode sheet for a general nickel-metal hydride battery, the active material layers of the negative electrode sheet are scraped to form a first active layer and a second active layer, then more active material powder is easily remained on the surface of the substrate assembly, that is, on the side of the first-ring exposed segment that is closer to the second active layer and the side of the tail-ring exposed segment that is closer to the first active layer, so that the active material is wasted, the resistance of the electrode assembly is increased, and the electrochemical performance of the nickel-metal hydride battery is affected. In addition, the scraped substances of the first active layer and the second active layer need to be re-added with a solvent to be dispersed into slurry and then put into use, so that the recycling complexity of the active substances is increased. Therefore, in the application, the first active layer and the second active layer are caused to be formed on the opposite side faces of the substrate assembly together in the process of carrying out slurry pulling treatment on the substrate assembly, the recycling convenience of the active substances is better realized, and the electrochemical performance of the nickel-metal hydride battery is better ensured.

According to the method for preparing a negative electrode sheet of nickel-metal hydride battery, the substrate roll is firstly unreeled, so that the plurality of substrate assemblies are sequentially arranged and unfolded along the width direction of the substrate assemblies, and then the substrate assemblies are continuously subjected to the slurry pulling treatment, so that the first active layer and the second active layer are caused to be formed on the opposite side faces of the substrate assembly together in the slurry pulling treatment process, and therefore, the simple recycling of active substances is better realized, and the electrochemical performance of the nickel-metal hydride battery is better ensured.

In one of the embodiments, performing a slurry pulling treatment on the substrate assembly includes steps of:

performing a slurry applying treatment on the substrate assembly to form active slurry layers which are formed on two opposite side faces of the substrate assembly and the thicknesses of which are correspondingly greater than that of the first active layer and the second active layer; and performing a slurry scraping treatment on the substrate assembly after the slurry applying treatment to form the first active layer and the second active layer that are correspondingly formed on the two opposite side faces of the substrate assembly.

It can be understood that even if the thickness of the active slurry layer on one side of the substrate assembly is greater than that of the first active layer, and the thickness of the active slurry layer on the opposite side is greater than that of the second active layer, the first active layer and the second active layer are obtained by performing slurry pulling treatment on the active slurry layers with sufficient thickness, so that the thicknesses of the first active layer and the second active layer obtained after slurry pulling are well ensured, simple recycling of active substances is well realized, and the electrochemical performance of the nickel-metal hydride battery is well ensured.

In one of the embodiments, after the step of performing a slurry pulling treatment on the substrate assembly, the method for preparing a negative electrode sheet further comprises a step of performing a drying treatment to the first active layer and the second active layer, so that the solvent of the first active layer and the second active layer is removed well, and effective obtaining of the negative electrode sheet of the nickel-metal hydride battery is further ensured. In one of the embodiments, after the step of performing a drying treatment to the first active layer and the second active layer, the method for preparing a negative electrode sheet further comprises a step of performing a roller pressing treatment to the first active layer and the second active layer after the drying treatment, so that the effective control of the thicknesses and the compaction density of the first active layer and the second active layer is better realized, and the effective obtaining of the negative electrode sheet of the nickel-metal hydride battery is further ensured In one of the embodiments, before the step of performing a roller pressing treatment to the first active layer and the second active layer and after the step of performing a drying treatment to the first active layer and the second active layer, the method for preparing a negative electrode sheet further comprises a step of performing a slicing treatment to the substrate assembly after the drying treatment, so that the substrate assembly is cut to form at least two monopolar sheets, so that the effective obtaining of the negative electrode sheet of the nickel-metal hydride battery is further ensured.

It should be noted that, the equipment that carries out slurry applying, roller pressing and drying to the substrate assembly in the application is the equipment that is used for slurry applying, roller pressing and drying of the negative electrode sheet of nickel-metal hydride battery of conventionality, therefore, the application does not carry out the repetition to the structure of the equipment that slurry applying, roller pressing and drying of substrate assembly again, and the application only aimed at protecting the treatment operations of slurry applying, roller pressing and drying of substrate assembly.

In one of the embodiments, a slurry pulling knife mold for nickel-metal hydride battery is used to perform a slurry scraping treatment on the substrate assembly after the slurry applying treatment. In order to better understand the above-mentioned slurry pulling knife mold for nickel-metal hydride battery, the following is explained in detail to above-mentioned slurry pulling knife mold for nickel-metal hydride battery.

Figure 5:
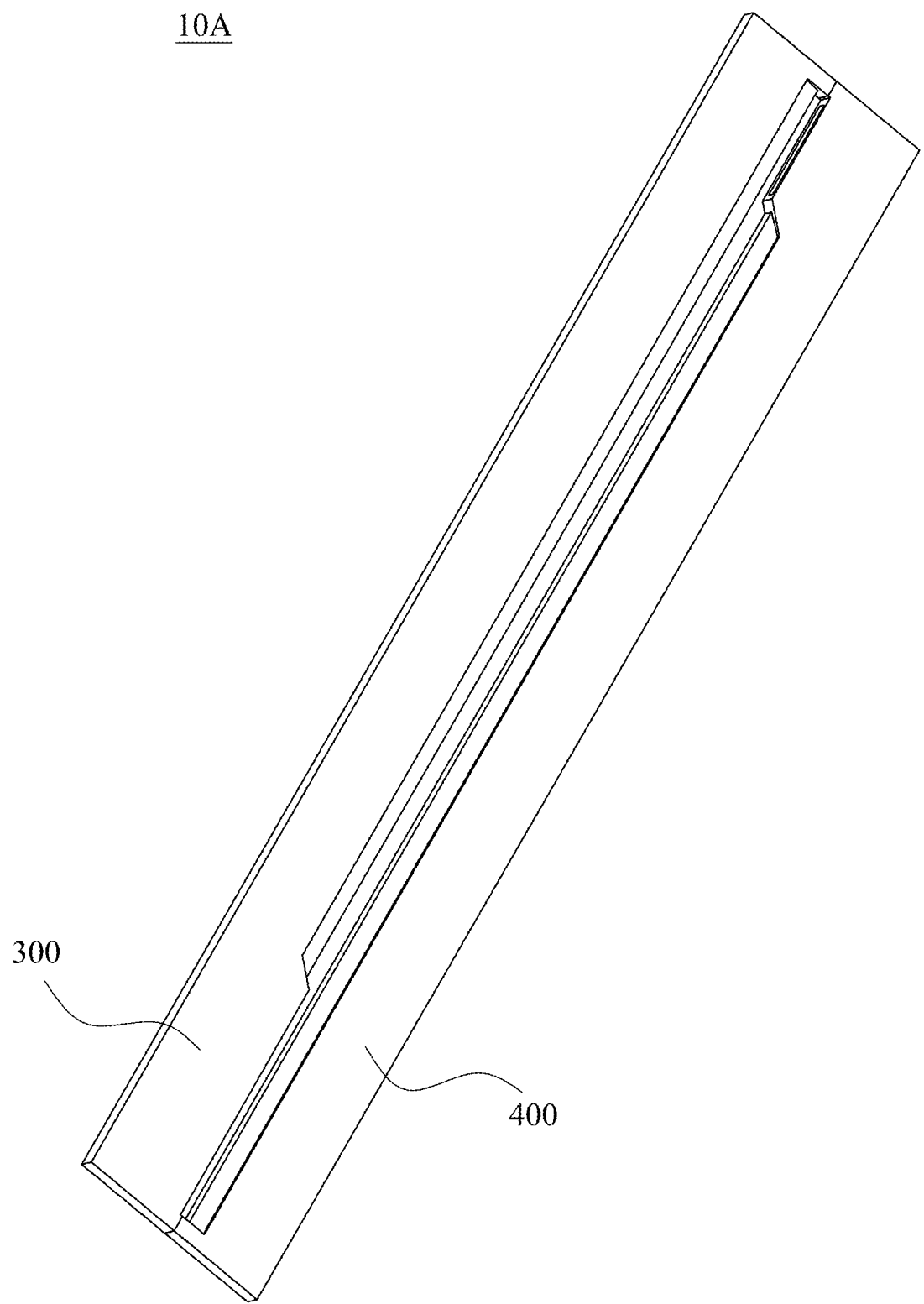
FIG. 5 is a schematic structural view of a slurry pulling knife mold for a nickel-metal hydride battery according to an embodiment of the present invention.
Figure 6:
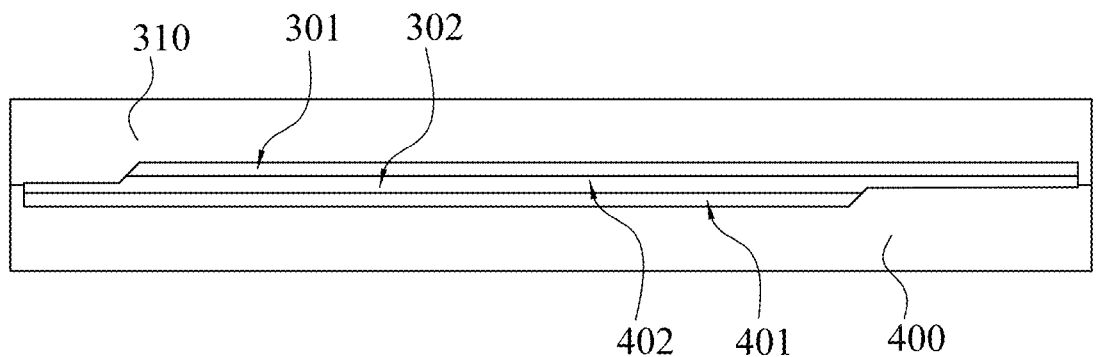
FIG. 6 is another schematic structural view of the slurry pulling knife mold for a nickel-metal hydride battery shown in FIG. 5.

Referring to FIGS. 5 to 6, slurry pulling knife mold 10A for nickel-metal hydride battery according to an embodiment includes:

an upper scraper module 300, the upper scraper module 300 including an upper control thick scraper 310, the upper control thick scraper 310 being provided with a first-active-layer wiping region 301 and an upper substrate assembly clearance region 302, the first-active-layer wiping region 301 being in communication with the upper substrate assembly clearance region 302;

a lower scraper module 400, the lower scraper module 400 comprising a lower control thick scraper 410, the lower control thick scraper 410 being provided with a second-active-layer wiping region 401 and a lower substrate assembly clearance region 402, the second-active-layer wiping region 401 being in communication with the lower substrate assembly clearance region 402; in which the upper substrate assembly clearance region 302 and the lower substrate assembly clearance region 402 coincide with each other, and the first-active-layer wiping region 301 and the second-active-layer wiping region 401 are arranged at intervals in a direction of gravity.

It can be understood that the first-active-layer wiping region 301 is communicated with the upper substrate assembly clearance region 302, the second-active-layer wiping region 401 is communicated with the lower substrate assembly clearance region 402, the upper substrate assembly clearance region 302 and the lower substrate assembly clearance region 402 coincide with each other, and the first-active-layer wiping region 301 and the second-active-layer wiping region 401 are arranged at intervals in a direction of gravity, that is, under the cooperation of the upper scraper module 300 and the lower scraper module 400, the substrate set is made to penetrate into the first-active-layer wiping region 301, the upper substrate assembly clearance region 302 and the second-active-layer wiping region 401 after being coated with sufficient active slurry on two opposite side faces, that is, the upper control thick scraper 310 and the lower control thick scraper 410 are made to scrape sufficient active slurry coated on two opposite side faces of the substrate assembly synchronously, so that a negative electrode sheet of the nickel-metal hydride battery is obtained by rapid slurry pulling, and the preparation efficiency of the negative electrode sheet of the nickel-metal hydride battery is well improved.

It should be noted that, the upper substrate assembly clearance region and the lower substrate assembly clearance region are both used for accommodating the substrate assembly, one side of the first-ring exposed segment of the substrate assembly that is closer to the first active layer is abutted against the upper control thick scraper, and one side of the tail-ring exposed segment of the substrate assembly that is closer to the second active layer is abutted against the lower control thick scraper 4; the first-active-layer wiping region 301 is used for accommodating the first active layer, and one side of the first active layer that is further away from the substrate assembly is abutted against the upper control thick scraper; the second-active-layer wiping region is used for accommodating the second active layer, and one side of the second active layer that is further away from the substrate assembly is abutted against the lower control thick scraper, and therefore the accurate sizes of the slurry pulling of the first active layer and the second active layer of the negative electrode sheet of the nickel-metal hydride battery is achieved.

Figure 7:
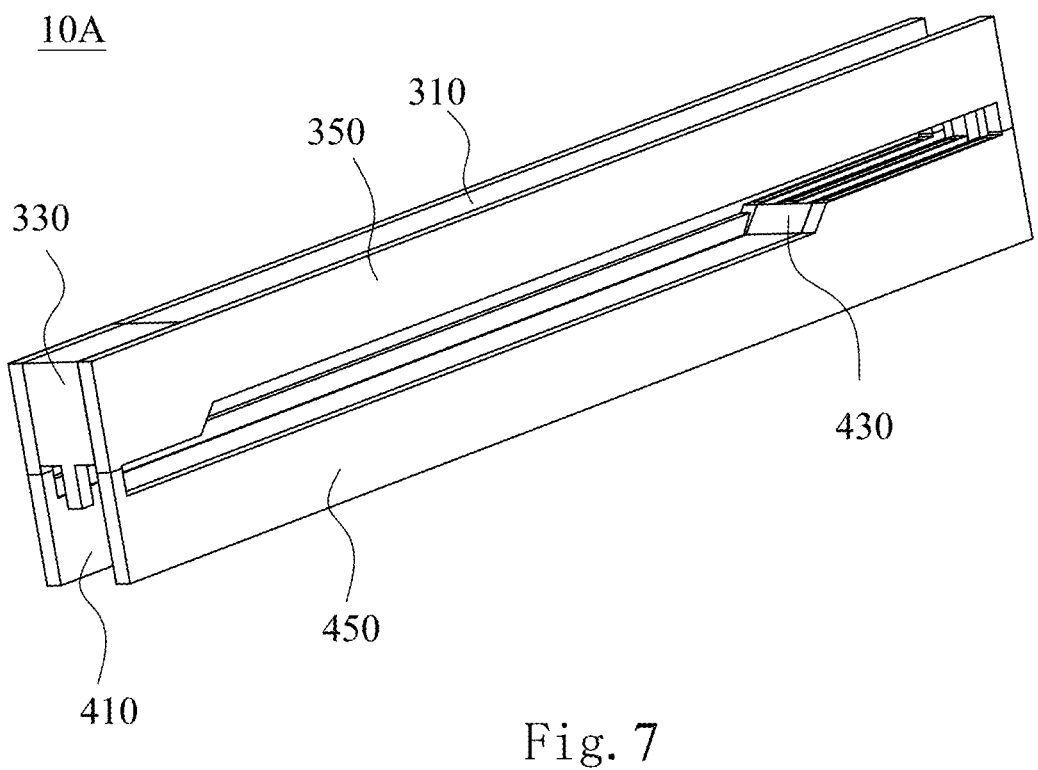
FIG. 7 is a schematic structural view of a slurry pulling knife mold of a nickel-metal hydride battery according to another embodiment of the present invention.
Figure 8:
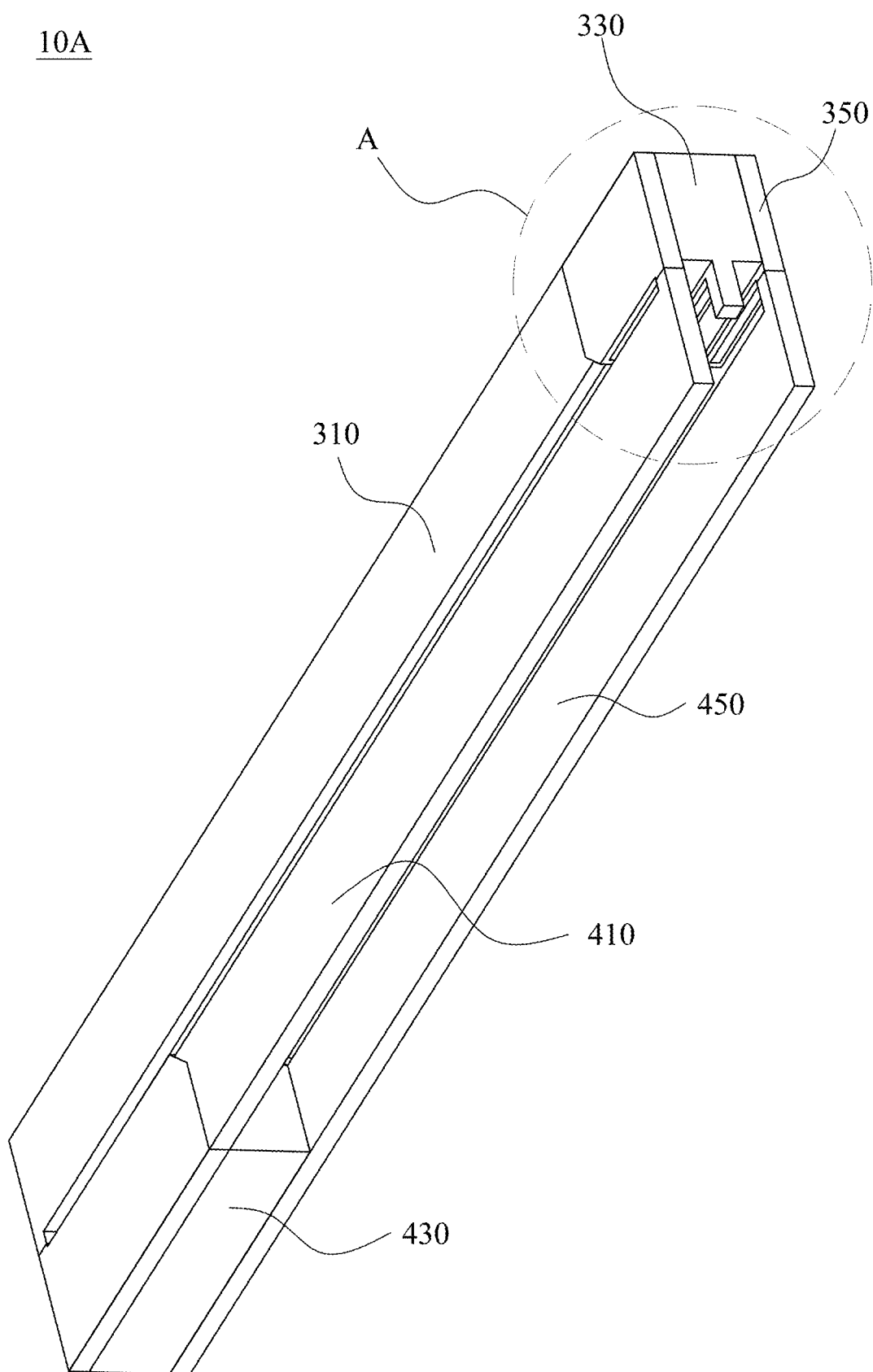
FIG. 8 is another structural schematic view of the slurry pulling knife mold for a nickel-metal hydride battery shown in FIG. 7.
Figure 9:
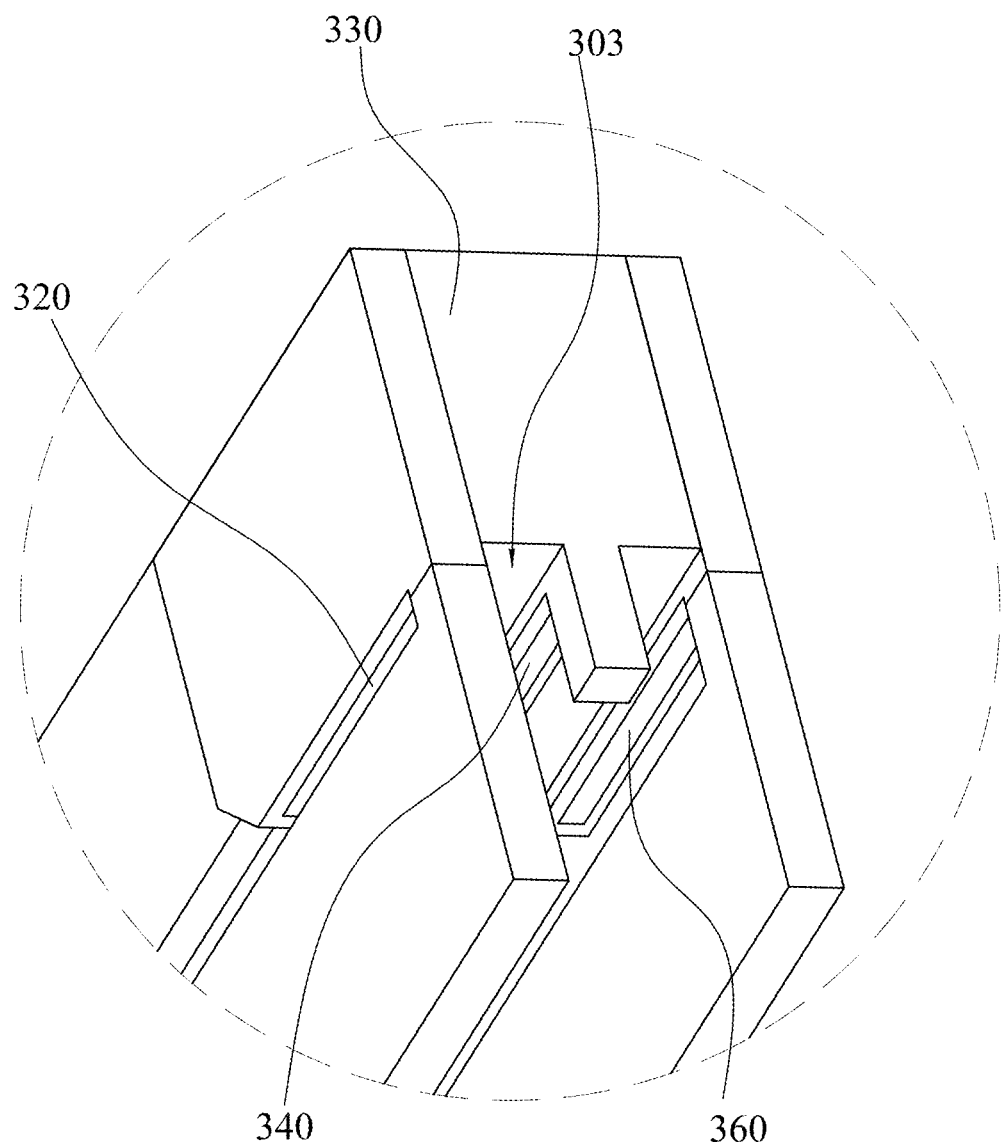
FIG. 9 is a partial enlarged view of the portion A of the slurry pulling knife mold for a nickel-metal hydride battery shown in FIG. 8.
Figure 10:
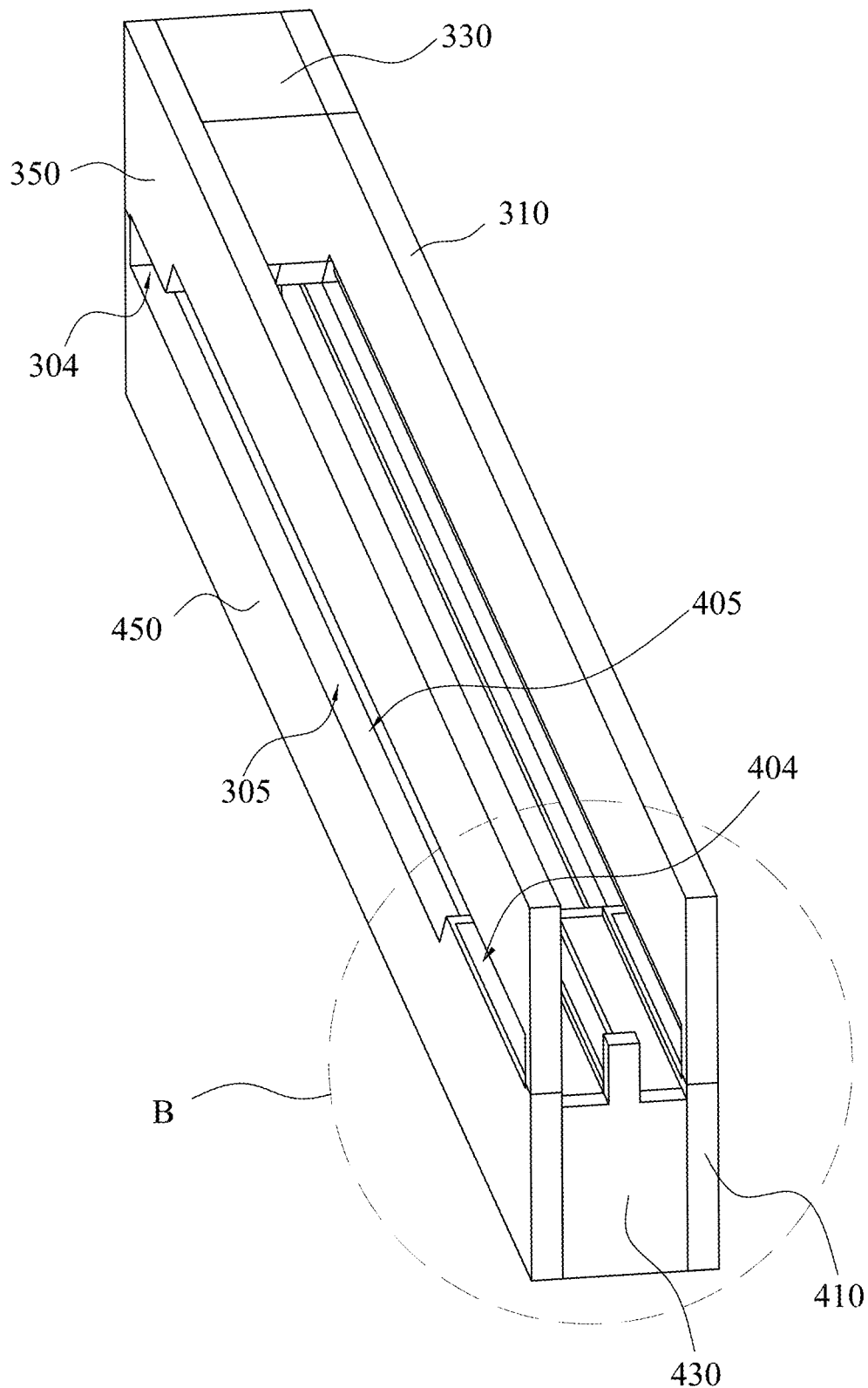
FIG. 10 is another structural schematic view of the slurry pulling knife mold for a nickel-metal hydride battery shown in FIG. 7.
Figure 11:
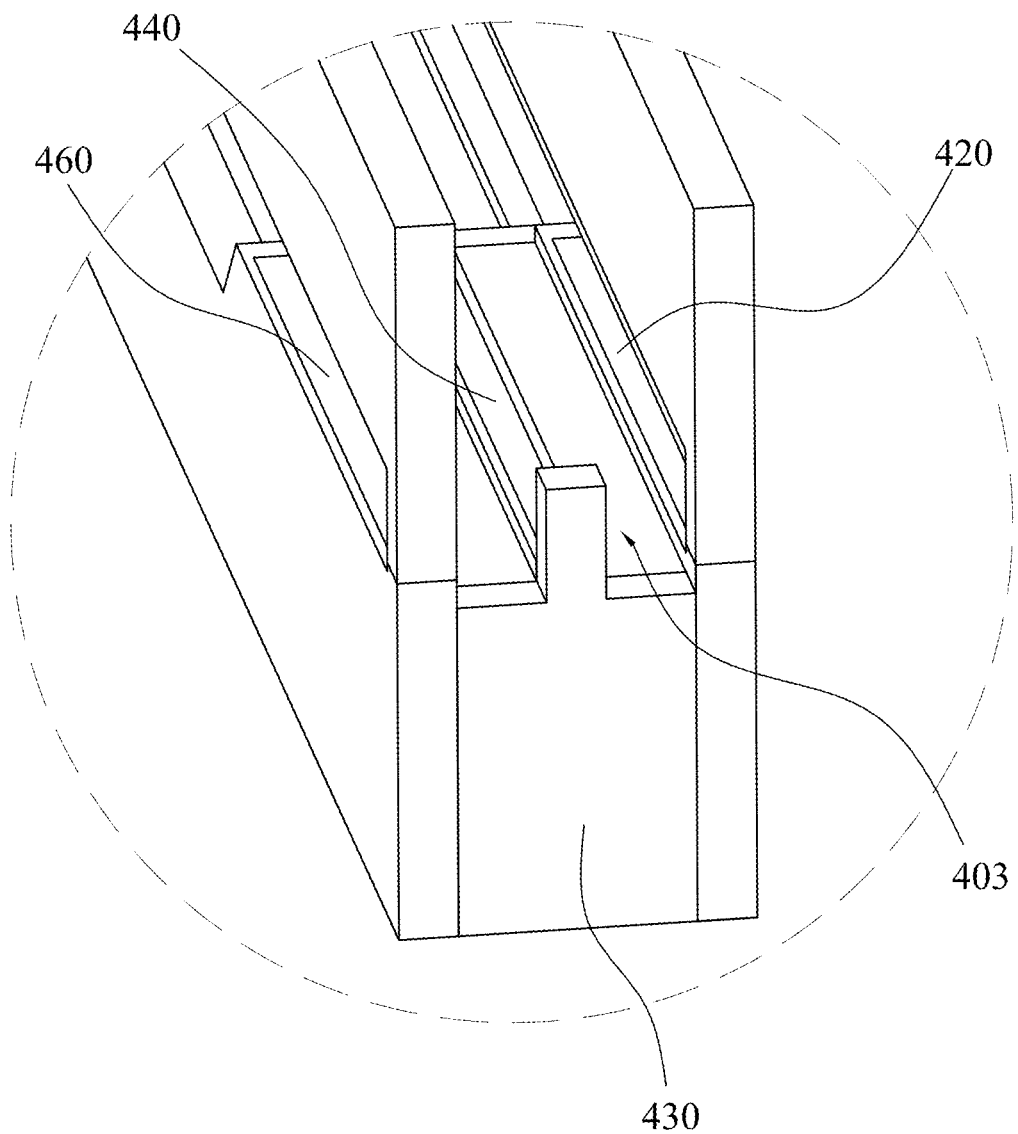
FIG. 11 is a partial enlarged view of the portion B of the slurry pulling knife mold for a nickel-metal hydride battery shown in FIG. 10.
Figure 12:
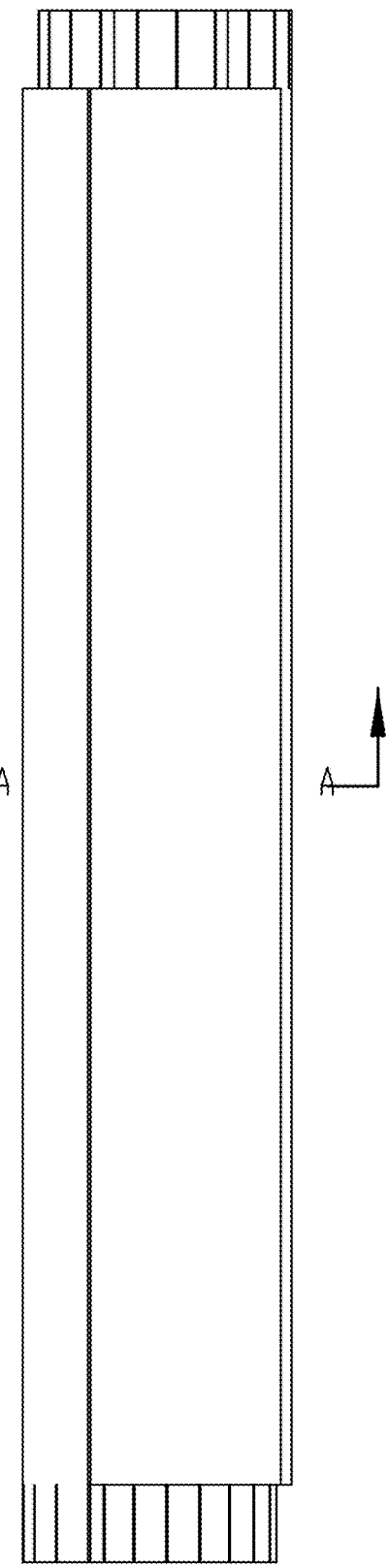
FIG. 12 is a schematic structural view of a nickel-metal hydride battery according to an embodiment of the present invention.
Figure 13:
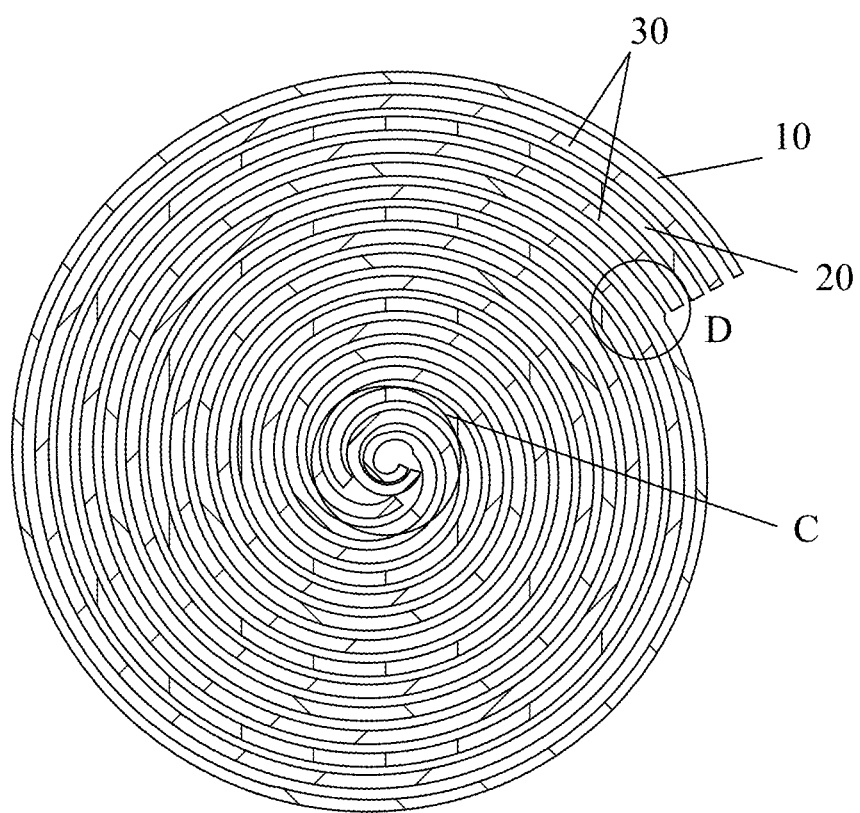
FIG. 13 is a sectional view of the nickel-metal hydride battery shown in FIG. 12 at A-A.
Figure 14:
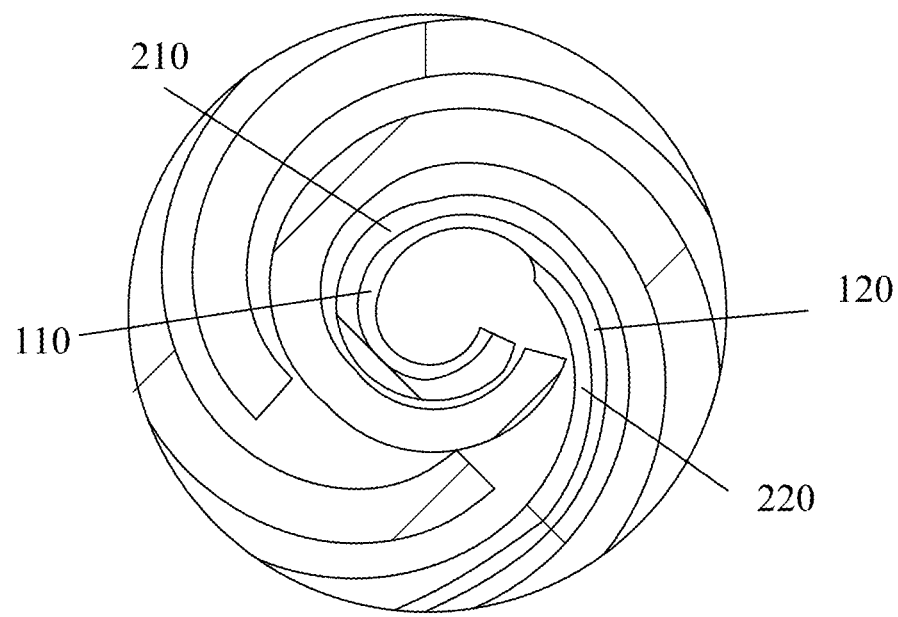
FIG. 14 is a partial enlarged view of the portion C of the nickel-metal hydride battery shown in FIG. 13.
Figure 15:
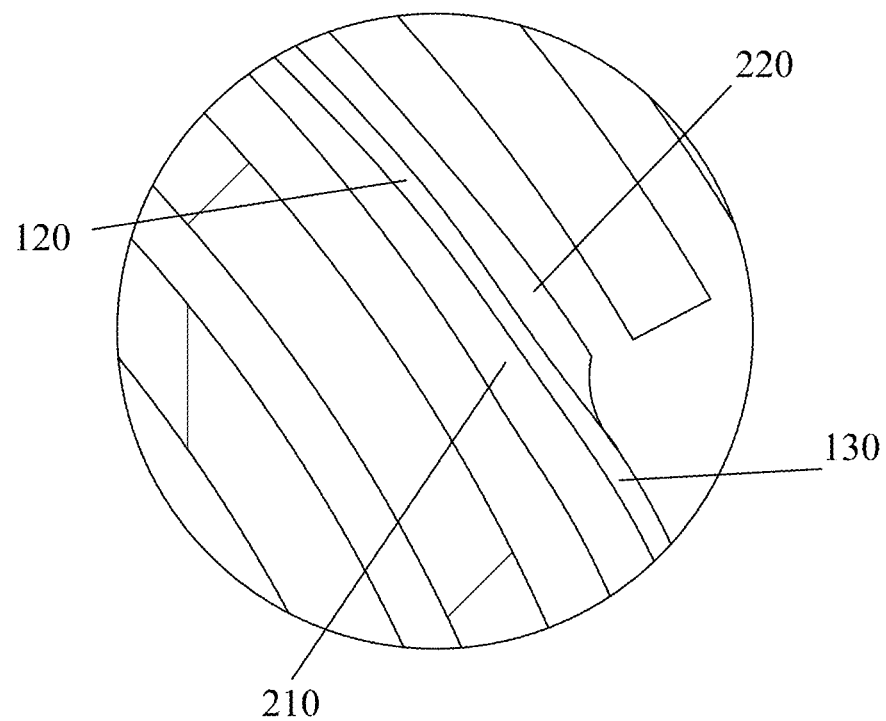
FIG. 15 is a partially enlarged view of the portion D of the nickel metal hydride battery shown in FIG. 13.

Referring to FIGS. 7 to 9, in one of the embodiments, an upper magnetic attraction piece 320 is embedded on a part of the upper control thick scraper 310 that is configured to be abutted against the first-ring exposed segment, and the upper magnetic attraction piece 320 is configured to be connected to the first-ring exposed segment in a magnetic attractable manner; and a lower magnetic attraction piece 420 is embedded on a part of the lower control thick scraper 410 that is configured to be abutted against the tail-ring exposed segment, and the lower magnetic attraction piece 420 is configured to be connected to the tail-ring exposed segment in a magnetic attractable manner, the tight contact between the first-ring exposed segment and the upper scraper module 300 is ensured, the tight contact between the tail-ring exposed segment and the lower scraper module 400 is ensured, and the accuracy of the sizes of the first active layer and the second active layer of the negative electrode sheet of the nickel-metal hydride battery that obtained by slurry pulling is further improved better.

In some of the embodiments, an end of the first-ring exposed segment abuts against the upper control thick scraper. Further, an upper end magnetic attraction piece is embedded on the part of the upper control thick scraper that is configured to be abutted against the first-ring exposed segment, and the upper magnetic attraction piece is configured to be connected to the end of the first-ring exposed segment in a magnetic attractable manner, so that the accuracy of the size of the first active layer of the negative electrode sheet of the nickel-metal hydride battery that obtained by slurry pulling is further improved better.

In some of the embodiments, an end of the tail-ring exposed segment abuts against the lower control thick scraper. Further, a lower end magnetic attraction piece is embedded on the part of the lower control thick scraper that is configured to be abutted against the tail-ring exposed segment, and the lower magnetic attraction piece is configured to be connected to the end of the tail-ring exposed segment in a magnetic attractable manner, so that the accuracy of the size of the second active layer of the negative electrode sheet of the nickel-metal hydride battery that obtained by slurry pulling is further improved better.

It can be understood that, in the process of the upper control thick scraper and the lower control thick scraper directly scraping and removing the excessive active slurry on the two opposite side faces of the substrate assembly, due to the influence of the active slurry on the surface of the substrate assembly, it is actually difficult for the substrate assembly to directly abut against the upper control thick scraper and the lower control thick scraper, even if the upper control thick scraper is provide with the upper magnetic attraction piece and the upper end magnetic attraction piece mounted thereon, it is only to further encourage the substrate assembly to abut the upper control thick scraper and the lower control thick scraper more tightly. Actually, more active slurry still remains on the side face of the first-ring exposed segment of the substrate assembly of the negative electrode sheet of the nickel-metal hydride battery that is closer to the second active layer and on the side face of the tail-ring exposed segment of the substrate assembly of the negative electrode sheet of the nickel-metal hydride battery that is closer to the first active layer, which are obtained by slurry pulling at the upper control thick scraper and the lower control thick scraper, so that the active slurry is wasted, and the electrochemical performance of the nickel-metal hydride battery is affected.

Referring to FIGS. 8 to 11, in order to better implement the full removal of the active slurries on the side face of the first-ring exposed segment of the substrate assembly of the negative electrode sheet of the nickel-metal hydride battery that is closer to the second active layer and on the side face of the tail-ring exposed segment of the substrate assembly of the negative electrode sheet of the nickel-metal hydride battery that is closer to the first active layer, which are obtained by slurry pulling, in some of the embodiments, the upper scraper module 300 further includes an upper cleaning mold base 330 and an upper cleaning soft scraper (not shown), the upper cleaning mold base 330 is connected to the upper control thick scraper 310, the upper cleaning mold base 330 is disposed at a position which avoids the first active layer, and the upper cleaning mold base 330 is provided with an upper scraper clearance region 303 thereon. The upper scraper clearance region 303 is sequentially and linearly arranged along the slurry pulling direction of the substrate assembly with the upper substrate assembly clearance region 302, the upper scraper clearance region 303 is communicated with the upper substrate set clearance area 302, and the upper cleaning soft scraper is disposed at the upper scraper clearance region 303 and is connected to the upper cleaning mold base 330. Further, the lower scraper module 400 further includes a lower cleaning mold base 430 and a lower cleaning soft scraper (not shown), the lower cleaning mold base 430 is connected to the lower control thick scraper 410, the lower cleaning mold base 430 is disposed at a position which avoids the second active layer, and the lower cleaning mold base 430 is provided with a lower scraper clearance region 403 thereon. The lower scraper clearance region 403 is sequentially and linearly arranged along the slurry pulling direction of the substrate assembly with the lower substrate assembly clearance region 402, the lower scraper clearance region 403 is communicated with the lower substrate set clearance area 402, and the lower cleaning soft scraper is disposed at the lower scraper clearance region 403 and is connected to the lower cleaning mold base 430.

It can be understood that upper scraper clearance region 303 and the upper substrate assembly clearance region 302 are sequentially and linearly arranged along the slurry pulling direction of the substrate assembly, and the lower scraper clearance region 403 and the lower substrate assembly clearance region 402 are sequentially and linearly arranged along the slurry pulling direction of the substrate assembly, that is, before the upper control thick scraper 310 and the lower control thick scraper 410 are used for performing slurry pulling and scraping on the excessive active slurry on two opposite side faces of the substrate assembly, firstly, synchronously performs reinforced cleaning on the active slurries on the side face of the first-ring exposed segment of the substrate assembly of the negative electrode sheet of the nickel-metal hydride battery that is closer to the second active layer and on the side face of the tail-ring exposed segment of the substrate assembly of the negative electrode sheet of the nickel-metal hydride battery that is closer to the first active layer by adopting the upper control thick scraper 310 and the lower control thick scraper 410, and the active slurry on one side of the substrate set, which is close to the second active layer, is close to the first active layer, is further reduced, and the active slurry on one side of the second active layer is further removed by the upper thickness control scraper 410. And then when the upper control thick scraper 310 and the lower control thick scraper 410 are used for performing slurry pulling and scraping on the excessive active slurry on two opposite side faces of the substrate assembly, the active slurries on the side face of the first-ring exposed segment of the substrate assembly of the negative electrode sheet of the nickel-metal hydride battery that is closer to the second active layer and on the side face of the tail-ring exposed segment of the substrate assembly of the negative electrode sheet of the nickel-metal hydride battery that is closer to the first active layer are well scraped, so that the tight butt joint between the side face of the first-ring exposed segment of the substrate assembly that is closer to the second active layer and the upper control thick scraper 310 and the tight butt joint between the side face of the tail-ring exposed segment of the substrate assembly that is closer to the first active layer and the lower control thick scraper 410 are promoted well. Thus, the sufficient removal of the active slurries on the side face of the first-ring exposed segment of the substrate assembly of the negative electrode sheet of the nickel-metal hydride battery that is closer to the second active layer and on the side face of the tail-ring exposed segment of the substrate assembly of the negative electrode sheet of the nickel-metal hydride battery that is closer to the first active layer, which are obtained by slurry pulling, is realized, the waste of the active slurry is reduced, and the electrochemical performance of the nickel-metal hydride battery is well ensured.

It should be noted that the upper cleaning soft scraper is used for tightly abutting against the side face of the first-ring exposed segment of the substrate assembly that is close to the first active layer; the lower cleaning soft scraper is used for tightly abutting against the side face of the tail-ring exposed segment of the substrate assembly that is closer to the first active layer, under the condition that the influence on the accuracy of the sizes of the first active layer and the second active layer is reduced, the cleaning effect of active substances of the side face of the first-ring exposed segment of the substrate assembly, which is closer to the first active layer, is better ensured, that is, the residue of active substances of the side face of the first-ring exposed segment of the substrate assembly, which is closer to the first active layer, is reduced, and the cleaning effect of active substances of the side of the tail-ring exposed segment of the substrate assembly, which is closer to the second active layer, is better ensured, that is, the residue of active substances of the side face of the tail-ring exposed segment of the substrate assembly, which is closer to the second active layer, is reduced, and further effective recycling of active substances is better realized, the resistance of the nickel-metal hydride battery is better reduced, and the electrochemical performance of the nickel-metal hydride battery is further improved.

Referring to FIGS. 8 to 11, in some of the embodiments, a side face of the upper cleaning mold base 330 that is closer to the upper cleaning soft scraper is configured to partially abut against a side face of the first-ring exposed segment of the substrate assembly that is closer to the first active layer. Further, an upper strong magnetic attraction piece 340 is embedded on a part of the upper cleaning mold base 330 that is abutted against the first-ring exposed segment of the substrate assembly, and the upper strong magnetic attraction piece 330 is configured to be connected to the first-ring exposed segment in a magnetic attractable manner, so that the residue of active substances on the side face of the first-ring exposed segment of the substrate assembly, which is closer to the first active layer, is further reduced, the active substances are better recycled, the resistance of the nickel-metal hydride battery is better reduced, and the electrochemical performance of the nickel-metal hydride battery is further improved.

Referring to FIGS. 8 to 11, in some of the embodiments, a side face of the lower cleaning mold base 430 that is closer to the lower cleaning soft scraper is configured to partially abut against a side face of the tail-ring exposed segment of the substrate assembly that is closer to the second active layer. Further, a lower strong magnetic attraction piece 440 is embedded on a part of the lower cleaning mold base 430 that is abutted against the tail-ring exposed segment of the substrate assembly, and the lower strong magnetic attraction piece 430 is configured to be connected to the tail-ring exposed segment in a magnetic attractable manner, so that the residue of active substances on the side face of the tail-ring exposed segment of the substrate assembly, which is closer to the second active layer, is further reduced, the active substances are better recycled, the resistance of the nickel-metal hydride battery is better reduced, and the electrochemical performance of the nickel-metal hydride battery is further improved.

In some of the embodiments, the number of the upper cleaning soft scrapers is at least two, the two upper cleaning soft scrapers are arranged at the positions which avoid the upper strong magnetic attraction piece, and the two upper cleaning soft scrapers are connected to the upper cleaning mold base at intervals and are both abutted to the side face of the first-ring exposed segment of the substrate assembly that is closer to the first active layer, so that the residue of active substances on the side face of the first-ring exposed segment of the substrate assembly, which is closer to the first active layer, is further reduced.

In some of the embodiments, the number of the lower cleaning soft scrapers is at least two, the two lower cleaning soft scrapers are arranged at the positions which avoid the lower strong magnetic attraction piece, and the two lower cleaning soft scrapers are connected to the lower cleaning mold base at intervals and are both abutted to the side face of the tail-ring exposed segment of the substrate assembly that is closer to the second active layer, so that the residue of active substances on the side face of the tail-ring exposed segment of the substrate assembly, which is closer to the second active layer, is further reduced.

In some of the embodiments, the width of the upper cleaning soft scraper is the same as the width of the first-ring exposed segment of the substrate assembly; the length of the lower cleaning soft scraper is the same as the width of the tail-ring exposed segment of the substrate assembly, that is, the upper cleaning soft scraper can scrape active substances on the area which is the same as width of the first-ring exposed segment of the substrate assembly at one time, and the lower cleaning soft scraper can scrape active substances on the area which is the same as the width of the tail-ring exposed segment of the substrate assembly at one time.

It can be understood that the upper cleaning soft scraper and the lower cleaning soft scraper are used for deeply scraping the active slurries on the side face of the first-ring exposed segment that is closer to the second active layer and on the side face of the tail-ring exposed segment that is closer to the first active layer, respectively, and the upper cleaning soft scraper and the lower cleaning soft scraper are soft scrapers, so that the removal effect of the active slurries on the side face of the first-ring exposed segment that is closer to the second active layer and on the side face of the tail-ring exposed segment that is closer to the first active layer can be better ensured, but simultaneously, it is relatively difficult for the upper cleaning soft scraper and the lower cleaning soft scraper to ensure the sufficient removal of the active slurries on the side face of the first-ring exposed segment that is closer to the second active layer and on the side face of the tail-ring exposed segment that is closer to the first active layer, under the condition that the amount of the active slurries on the side face of the first-ring exposed segment that is closer to the second active layer and on the side face of the tail-ring exposed segment that is closer to the first active layer is relatively large.

In order to further better implement the sufficient removal of the active slurries on the side face of the first-ring exposed segment of the substrate assembly of the negative electrode sheet of the nickel-metal hydride battery that is closer to the second active layer and on the side face of the tail-ring exposed segment of the substrate assembly of the negative electrode sheet of the nickel-metal hydride battery that is closer to the first active layer, which are obtained by slurry pulling, referring to FIGS. 8 to 11, in some of the embodiments, the upper scraper module 300 further includes an upper pre-scraper 350 which is connected to the upper cleaning mold base 330, the upper pre-scraper 350 is provided with a first-active-layer clearance region 304 and an upper substrate assembly wiping region 305 which is in communication with the first-active-layer clearance region 304 and the upper scraper clearance region 303, and the upper substrate assembly wiping region 305, the upper scraper clearance region 303 and the upper substrate assembly clearance region 302 are sequentially and linearly arranged along the slurry pulling direction of the substrate assembly. The lower scraper module 400 further includes a lower pre-scraper 450 which is connected to the lower cleaning mold base 430, the lower pre-scraper 450 is provided with a second-active-layer clearance region 404 and a lower substrate assembly wiping region 405 which is communication with the second-active-layer clearance region 404 and the lower scraper clearance region 403, and the lower substrate assembly wiping region 405, the lower scraper clearance region 403 and the lower substrate assembly clearance region 402 are sequentially and linearly arranged along the slurry pulling direction of the substrate assembly. The upper substrate assembly wiping region 305 and the lower substrate assembly wiping region 405 coincide with each other, and the first-active-layer clearance region 304 and the second-active-layer clearance region 404 are arranged at intervals in the direction of gravity.

It can be understood that the upper substrate assembly wiping region 305, the upper scraper clearance region 303 and the upper substrate assembly clearance region 302 are sequentially and linearly arranged along the slurry pulling direction of the substrate assembly, and the lower substrate assembly wiping region 405, the lower scraper clearance region 403 and the lower substrate assembly clearance region 402 are sequentially and linearly arranged along the slurry pulling direction of the substrate assembly, that is, the upper pre-scraper 350 and the lower pre-scraper 450 respectively first scrape the active slurry on the side face of the first-ring exposed segment that is closer to the second active layer and the active slurry on the side face of the tail-ring exposed segment, so that the amounts of the active slurries on the side face of the first-ring exposed segment that is closer to the second active layer and the active slurry on the side face of the tail-ring exposed segment entering the upper cleaning soft scraper and the lower cleaning soft scraper are preferably reduced, the upper cleaning soft scraper and the lower cleaning soft scraper are further matched, and the upper control thick scraper 310 and the lower control thick scraper 410 are matched, the waste of the active slurries on the side face of the first-ring exposed segment of the substrate assembly of the negative electrode sheet of the nickel-metal hydride battery that is closer to the second active layer and on the side face of the tail-ring exposed segment of the substrate assembly of the negative electrode sheet of the nickel-metal hydride battery that is closer to the first active layer is well reduced.

It should be noted that the upper substrate assembly scraping region and the lower substrate assembly scraping region are used for accommodating the substrate assembly, the active substances are adhered to two opposite side faces of the first-ring exposed segment of the substrate assembly after slurry applying, at the moment, the side face of the first-ring exposed segment of the substrate assembly, which is closer to the first active layer, is abutted against the upper pre-scraper together with the active substances adhered thereto, so that the active substances are adhered to the two side faces of the first-ring exposed segment of the substrate assembly by the upper pre-scraper for roughly scraping and removing, the amount of the active substances required to be scraped at the upper cleaning soft scraper is reduced, and the cleaning effect of the active substances on the side face of the first-ring exposed segment of the substrate assembly that is closer to the first active layer can be better ensured even if the active substances are difficult to be rapidly discharged at the upper cleaning soft scraper, that is, the residues of the active substances on the side face of the first-ring exposed segment of the substrate assembly that is closer to the first active layer are reduced. The active substances are adhered to two opposite side faces of the tail-ring exposed segment of the substrate assembly after slurry applying, at the moment, the side face of the tail-ring exposed segment of the substrate assembly, which is closer to the second active layer, is abutted against the lower pre-scraper together with the active substances adhered thereto, so that the active substances are adhered to the two side faces of the tail-ring exposed segment of the substrate assembly by the lower pre-scraper for roughly scraping and removing, the amount of the active substances required to be scraped at the lower cleaning soft scraper is reduced, and the cleaning effect of the active substances on the side face of the tail-ring exposed segment of the substrate assembly that is closer to the second active layer can be better ensured even if the active substances are difficult to be rapidly discharged at the lower cleaning soft scraper, that is, the residues of the active substances on the side face of the tail-ring exposed segment of the substrate assembly that is closer to the second active layer are reduced. Thus, the active substances are effectively recycled, the resistance of the nickel-metal hydride battery is further better reduced, and the electrochemical performance of the nickel-metal hydride battery is further improved.

Referring to FIGS. 8 to 11, in some of the embodiments, an upper pre-scraping magnetic attraction piece 360 is embedded on a part of the upper pre-scraper 350 that is configured to be abutted against the first-ring exposed segment, and the upper pre-scraping magnetic attraction piece 360 is configured to be connected to the first-ring exposed segment in a magnetic attractable manner; a lower pre-scraping magnetic attraction piece 460 is embedded on the part of the lower pre-scraper that is configured to be abutted against the tail-ring exposed segment, and the lower pre-scraping magnetic attraction piece 460 is configured to be connected to the tail-ring exposed segment in a magnetic attractable manner, so that the scraping effect of the upper pre-scraper 350 on the active substance on the side face of the first-ring exposed segment that is closer to the first active layer is improved, and the scraping effect of the lower pre-scraper 450 on the active substance on the side face of the tail-ring exposed segment that is closer to the second active layer is improved.

It should be noted that, the position for arranging the slurry pulling knife mold for nickel-metal hydride battery is a position for arranging the conventional slurry pulling knife mold of the negative electrode sheet of the nickel-metal hydride battery. The present application does not define the arrangement position and the installation structure of the slurry pulling knife mold for nickel-metal hydride battery, and only protects the structural relation of the slurry pulling knife mold for nickel-metal hydride battery and the processing operation of the slurry pulling knife mold for nickel-metal hydride battery for slurry pulling processing of the nickel-metal hydride battery.

Referring to FIGS. 12 to 15, the application also provides a nickel-metal hydride battery 90. The nickel-metal hydride battery 90 includes a positive electrode sheet 20, a separator 30 and the negative electrode sheet 10 according to any one of the embodiments, the positive electrode sheet 20, the separator 30 and the negative electrode sheet 10 are sequentially stacked and wound to form an electrode assembly, and the first-ring exposed segment, the first active layer, the second active layer and the tail-ring exposed segment form a first ring, a second ring, a second-last ring and a last ring of the electrode assembly, respectively. Further, referring to FIGS. 1 to 3, in the present embodiment, negative electrode sheet 10 of the nickel-metal hydride battery includes a substrate assembly 100 and an active layer assembly 200. The substrate assembly 100 includes a first-ring exposed segment 110, a middle-ring covered segment 120 and a tail-ring exposed segment 130, the first-ring exposed segment 110, and the middle-ring covered segment 120 and the tail-ring exposed segment 130 are connected in sequence. The active layer assembly 200 includes a first active layer 210 and a second active layer 220 that are located on two opposite side faces of the middle-ring covered segment 120, the first active layer 210 is attached to the first-ring exposed segment 110 and the middle-ring covered segment 120, and the second active layer 220 is attached to the middle-ring covered segment 120 and the tail-ring exposed segment 130.

The nickel-metal hydride battery herein adopts the negative electrode sheet of the nickel-metal hydride battery, so that the electrochemical performance of the nickel-metal hydride battery is well ensured.

Compared with the prior art, the present invention has at least the following advantages:

according to the negative electrode sheet 10 of nickel-metal hydride battery of the present invention, the first active layer 210 is only covered on the first-ring exposed segment 110 and the middle-ring covered segment 120, the second active layer 220 is only covered the middle-ring covered segment 120 and the tail-ring exposed segment 130, so that when the negative electrode sheet 10 is pre-wound with a side of the substrate assembly 100 that is closer to the second active layer 220 as an inner layer, the first-ring exposed segment 110 forms an innermost layer and the first active layer 210 forms a second inner layer, and then the negative electrode sheet 10 is wound together with the separator 30 and the positive electrode sheet 20, thus buffering the volume and relieving the stress of the pre-winding negative electrode sheet 10 of nickel-metal hydride battery. In addition, when the negative electrode sheet 10 is completed winding with a side of the substrate assembly 100 that is closer to the first active layer 210 as an outer layer, the tail-ring exposed segment 130 forms an outermost layer and the second active layer 220 forms a second outer layer, thus buffering the volume and relieving the stress of the winding negative electrode sheet 10 of nickel-metal hydride battery, thereby ensuring the energy density of the nickel-metal hydride battery and achieving effective control of the tightness of the electrode assembly of the nickel-metal hydride battery without additional structure and thus effectively reducing the assembling and processing costs of the nickel-metal hydride battery.

The above examples illustrate only a few embodiments of the invention, which are described in detail and are not to be construed as limiting the scope of the invention. It should be noted that it will be apparent to those skilled in the art that several variations and modifications can be made without departing from the spirit of the invention, which are all within the scope of the invention. Accordingly, the scope of protection of the present invention is to be determined by the appended claims.

What is claimed is:

1. A method for preparing a negative electrode sheet of nickel-metal hydride battery, comprising steps of:

obtaining a substrate roll;

unwinding the substrate roll to unroll the substrate roll to form a substrate assembly, the substrate assembly comprising a first-ring exposed segment, a middle-ring covered segment and a tail-ring exposed segment, the first-ring exposed segment, the middle-ring covered segment and the tail-ring exposed segment are sequentially connected; and performing a slurry pulling treatment on the substrate assembly to form a first active layer and a second active layer that are formed together on two opposite side faces of the substrate assembly, the first active layer being attached to the first-ring exposed segment and the middle-ring covered segment, and the second active layer being attached to the middle-ring covered segment and the tail-ring exposed segment;

the performing a slurry pulling treatment on the substrate assembly comprises steps of:

performing a slurry applying treatment on the substrate assembly to form active slurry layers which are formed on two opposite side faces of the substrate assembly and thicknesses of which are correspondingly greater than that of the first active layer and the second active layer; and performing a slurry scraping treatment on the substrate assembly after the slurry applying treatment to form the first active layer and the second active layer that are correspondingly formed on the two opposite side faces of the substrate assembly;

wherein a slurry pulling knife mold for nickel-metal hydride battery is used to perform a slurry scraping treatment on the substrate assembly after the slurry applying treatment; and the slurry pulling knife mold for nickel-metal hydride battery comprises:

an upper scraper module, the upper scraper module comprising an upper control thick scraper, the upper control thick scraper being provided with a first-active-layer wiping region and an upper substrate assembly clearance region, the first-active-layer wiping region being in communication with the upper substrate assembly clearance region; and a lower scraper module, the lower scraper module comprising a lower control thick scraper, the lower control thick scraper being provided with a second-active-layer wiping region and a lower substrate assembly clearance region, the second-active-layer wiping region being in communication with the lower substrate assembly clearance region;

the upper substrate assembly clearance region and the lower substrate assembly clearance region coincide with each other, and the first-active-layer wiping region and the second-active-layer wiping region are arranged at intervals in a direction of gravity;

wherein an upper magnetic attraction piece is embedded on a part of the upper control thick scraper that is configured to be abutted against the first-ring exposed segment, and the upper magnetic attraction piece is configured to be connected to the first-ring exposed segment in a magnetic attractable manner; and a lower magnetic attraction piece is embedded on a part of the lower control thick scraper that is configured to be abutted against the tail-ring exposed segment, and the lower magnetic attraction piece is configured to be connected to the tail-ring exposed segment in a magnetic attractable manner.

2. The method for preparing a negative electrode sheet according to claim 1, wherein an end of the first-ring exposed segment abuts against the upper control thick scraper; an upper end magnetic attraction piece is embedded on the part of the upper control thick scraper that is configured to be abutted against the first-ring exposed segment, and the upper magnetic attraction piece is configured to be connected to the end of the first-ring exposed segment in a magnetic attractable manner.

3. The method for preparing a negative electrode sheet according to claim 1, wherein an end of the tail-ring exposed segment abuts against the lower control thick scraper; a lower end magnetic attraction piece is embedded on the part of the lower control thick scraper that is configured to be abutted against the tail-ring exposed segment, and the lower magnetic attraction piece is configured to be connected to the end of the tail-ring exposed segment in a magnetic attractable manner.

4. The method for preparing a negative electrode sheet according to claim 1, wherein the upper scraper module further comprises an upper cleaning mold base and an upper cleaning soft scraper, the upper cleaning mold base is connected to the upper control thick scraper, the upper cleaning mold base is disposed at a position which avoids the first active layer, and the upper cleaning mold base is provided with an upper scraper clearance region thereon that is sequentially and linearly arranged along a slurry pulling direction of the substrate assembly with the upper substrate assembly clearance region and which is in communication with the upper substrate assembly clearance region, and the upper cleaning soft scraper is disposed at the upper scraper clearance region and is connected to the upper cleaning mold base.

5. The method for preparing a negative electrode sheet according to claim 4, wherein the lower scraper module further comprises a lower cleaning mold base and a lower cleaning soft scraper, the lower cleaning mold base is connected to the lower control thick scraper, the lower cleaning mold base is disposed at a position which avoids the second active layer, and the lower cleaning mold base is provided with a lower scraper clearance region thereon that is sequentially and linearly arranged along the slurry pulling direction of the substrate assembly with the lower substrate assembly clearance region and which is in communication with the lower substrate assembly clearance region, and the lower cleaning soft scraper is disposed at the lower scraper clearance region and is connected to the lower cleaning mold base.

6. The method for preparing a negative electrode sheet according to claim 5, wherein a side face of the upper cleaning mold base that is closer to the upper cleaning soft scraper is configured to be partially abutted against a side face of the first-ring exposed segment of the substrate assembly that is closer to the first active layer; and an upper strong magnetic attraction piece is embedded on a part of the upper cleaning mold base that is abutted against the first-ring exposed segment of the substrate assembly, and the upper strong magnetic attraction piece is configured to be connected to the first-ring exposed segment in a magnetic attractable manner.

7. The method for preparing a negative electrode sheet according to claim 6, wherein a side face of the lower cleaning mold base that is closer to the lower cleaning soft scraper is configured to be partially abutted against a side face of the tail-ring exposed segment of the substrate assembly that is closer to the second active layer; and a lower strong magnetic attraction piece is embedded on a part of the lower cleaning mold base that is abutted against the tail-ring exposed segment of the substrate assembly, and the lower strong magnetic attraction piece is configured to be connected to the tail-ring exposed segment in a magnetic attractable manner.

8. The method for preparing a negative electrode sheet according to claim 7, wherein the upper scraper module further comprises an upper pre-scraper which is connected to the upper cleaning mold base, the upper pre-scraper is provided with a first-active-layer clearance region and an upper substrate assembly wiping region which is communication with the first-active-layer clearance region and the upper scraper clearance region, and the upper substrate assembly wiping region, the upper scraper clearance region and the upper substrate assembly clearance region are sequentially and linearly arranged along the slurry pulling direction of the substrate assembly;

the lower scraper module further comprises a lower pre-scraper which is connected to the lower cleaning mold base, the lower pre-scraper is provided with a second-active-layer clearance region and a lower substrate assembly wiping region which is communication with the second-active-layer clearance region and the lower scraper clearance region, and the lower substrate assembly wiping region, the lower scraper clearance region and the lower substrate assembly clearance region are sequentially and linearly arranged along the slurry pulling direction of the substrate assembly; and wherein the upper substrate assembly wiping region and the lower substrate assembly wiping region coincide with each other, and the first-active-layer clearance region and the second-active-layer clearance region are arranged at intervals in the direction of gravity.

9. The method for preparing a negative electrode sheet according to claim 8, wherein an upper pre-scraping magnetic attraction piece is embedded on a part of the upper pre-scraper that is configured to be abutted against the first-ring exposed segment, and the upper pre-scraping magnetic attraction piece is configured to be connected to the first-ring exposed segment in a magnetic attractable manner; and a lower pre-scraping magnetic attraction piece is embedded on a part of the lower pre-scraper that is configured to be abutted against the tail-ring exposed segment, and the lower pre-scraping magnetic attraction piece is configured to be connected to the tail-ring exposed segment in a magnetic attractable manner.

* * * * *